United States Patent

Meyer

[15] 3,662,999
[45] May 16, 1972

[54] APPARATUS FOR CUTTING THICK-WALLED TUBULAR ELEMENTS

[72] Inventor: Herbert Meyer, Oberhausen-Sterkrade, Germany

[73] Assignee: Mannesmann Aktiengesellschaft, Dusseldorf, Germany

[22] Filed: Oct. 23, 1970

[21] Appl. No.: 83,490

[30] Foreign Application Priority Data

Oct. 29, 1969 Germany.....................P 19 55 395.8

[52] U.S. Cl..........................................266/23 NN, 148/9.6
[51] Int. Cl...........................................................B23k 7/04
[58] Field of Search......................266/23 NN, 23 N; 148/9.6;
83/34, 49, 564; 144/34 R

[56] References Cited

UNITED STATES PATENTS

| 1,260,316 | 3/1918 | Bryce | 266/23 N |
| 2,345,688 | 4/1944 | Smith | 148/9.6 |
| 2,448,089 | 8/1948 | Duvall | 266/23 N |

Primary Examiner—Robert D. Baldwin
Attorney—Smyth, Roston & Pavitt

[57] ABSTRACT

A cutting torch is mounted on a carriage which, in turn, is mounted on an arm pivoting on an axis parallel to the axis of a pipe to be cut. Cutting is carried out in a plane, and from two different pivot positions along correspondingly different directions to obtain two merging kerfs.

3 Claims, 1 Drawing Figure

PATENTED MAY 16 1972 3,662,999
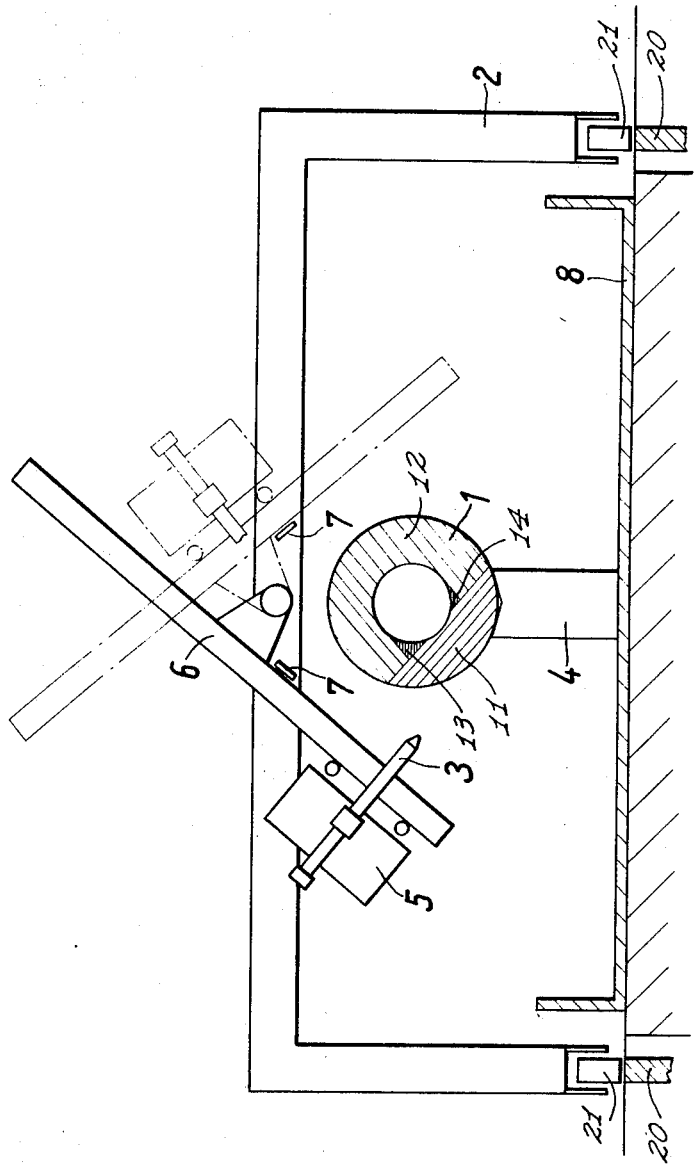
Inventor:
Herbert Meyer
Smyth, Roston & Pavitt
By Rolf H. Siegemund
ATTORNEYS

APPARATUS FOR CUTTING THICK-WALLED TUBULAR ELEMENTS

The present invention relates to apparatus for cutting to length thick-walled tubular elements, for example, hollow ingots produced by continuous casting whereby a torch is used as cutting tool.

Cutting through thick-walled hollow elements, such as tubular ingots, by means of a cutting torch poses the difficulty that the cutting flame is interrupted as soon as entering and traversing the interior of the hollow ingot. Therefore, the ingot is not or only inadequately cut through, which, in turn, requires additional finishing work. Also, loss in material is incurred. In order to obviate this inadequacy, it has been tried to cut the wall of the hollow ingot until the wall is traversed just at a particular point, and to interrupt cutting; the tube is turned on its axis thereafter and completely cut by a second cutting operation.

Upon analyzing operating conditions for that method, it has to be observed that a hollow ingot produced by continuous casting is neither completely round nor completely straight. Therefor, upon turning, the tube may assume an off-set position so that the two cutting steps produce misaligned kerfs.

Instead of turning the hollow ingot one could use several, independently operating torches. In order to obtain a straight, uniform kerf and clean cutting planes, these torches have to be arranged in a very particular, mutual spatial relationship. Also, they have to have similar nozzle dimensions and operate at equal pressures. It was found rather difficult to maintain such operating conditions consistently. Additionally, it has to be observed that the flame of one cutting torch is actually directed to some extent towards another torch so that the latter cutting tool requires additional protection.

It is apparent, therefor, that cutting of pipes and tubing made by continuous casting has heretofore not been solved satisfactorily. It is an object of the present invention to provide apparatus and arrangement for cutting to length thick-walled, hollow ingots so as to obtain a planar, clean kerf of uniform dimensions. In accordance with the invention it is suggested to provide a pivotable arm for supporting carriage means on which is mounted the torch. The arm is pivoted on suitable support means that remain stationary during cutting. The pivot axis is disposed parallel to the axis of the hollow ingot, and the arm can be pivoted on that axis over an angle of about 90° to 100° to the horizontal. By means of the carriage, the torch can be displaced along the arm in either position for obtaining progressive cutting.

The device constructed in accordance with the invention permits cutting of thick-walled hollow ingots in two cutting steps and it was found that resulting kerf is in fact clean and uniform; loss in material has been minimized.

While the specification concludes with claims particularly pointing out and distinctly claiming the subject matter which is regarded as the invention, it is believed that the invention the objects and features of the invention and further objects, features and advantages thereof will be better understood from the following description taken in connection with the accompanying drawings in which:

The FIGURE shows a front view of cutting equipment constructed in accordance with the preferred embodiment of the invention, with section through a pipe to be cut in the cutting plane.

Proceeding now to the detailed description of the drawing, in the FIGURE thereof there is illustrated a hollow ingot 1 produced by continuous casting. By way of example, it is assumed that the outer diameter of pipe 1 is 750 millimeters, and the inner diameter is 350 millimeters. Implementation and tooling to be described in the following involves cutting equipment for cutting pre-selected lengths from that hollow ingot for further working.

The equipment includes a gantry type bridge 2 as a means for supporting torch 3 and other equipment. The gantry 2 is movably disposed on tracks 20 there being suitable wheels 21 riding on the tracks. As the tracks extend parallel to tube or pipe 1, the gantry is displaceable along the pipe, in direction transverse to the plane of the drawing. A stand or gate 4 supports the hollow ingot 1 for disposition in that direction. The stand 4 is stationary, so is the ingot thereon.

Of course, the relation could be reversed in that pipe shaped ingot 1 is disposed on a carriage for displacement colinear with the axis of the pipe and relative to a stationary gantry. It will be noted that this axial displacement has nothing to do with prior art turning of the pipe on its own axis. Axial displacement is provided here merely for metering the length of section tubing to be cut.

A carriage 5 is provided for immediate support of torch 3. The carriage 5 is movably disposed on a pivot arm 6. The pivot arm is journaled in a manner eliminating clearance as much as possible. By means of hydraulic actuators or the like (not shown) arm 6 can be pivoted on its journal axis. Pivot arm 6 is illustrated in a first operating position, a second operating position is depicted in phantom lines in the FIGURE. The pivot axis of arm 6 extends parallel to the axis of hollow ingot 1 and of gantry displacement, both axes being at right angles to the plane of the drawing. Also, it has to be mentioned that the pivot axis is at right angle to the cutting and operating plane of torch 3 which is the plane of the drawing. Carriage 5 moves in (or parallel to) that plane.

Long travel paths for the torch are to be avoided, and for this the pivot axis is disposed as close as reasonably possible and practicable to the axis of pipe 1. Stop means 7 are provided so that arm 6 will in effect be pivoted in between two limit positions. During cutting the center of gravity of the side of arm 6, carrying carriage 5, should be below the pivot point, so that stops 7 lock the arm in the respective position merely by form of gravity. However, additional locking means could be provided. The stops 7 are preferably adjustable so as to determine the angle between the two different operating positions for arm 6 and torch 3 thereon.

The torch 3 is positioned on carriage 5 and in relation to arm 6 so that it has an angle of 40° down relative to the horizontal in each of the two positions of the arm. It was found that choosing this angle is of advantage for catching slag in a collecting tray 8.

The apparatus in accordance with the invention permits the following operation. The first cutting step finds arm 6 in the illustrated position. Also, carriage 5 and torch 3 are shown in starting position for that step. The hollow ingot is cut first from one side, beginning tangentially on the ingot, and carriage 5 is moved in up direction as cutting progresses. A cutting kerf is produced as indicated by hatching lines 11 leading from upper left to lower right. The hatching lines have direction that denotes parallel directions of the torch flame axis, as the cutting proceeds transversely thereto (all directions taken in the plane of the drawing), until about tangential to the hollow interior of pipe 1. Subsequently, arm 6 is pivoted to assume the phantom position, and now torch 3 completes the cutting, whereby carriage 5 is moved in down direction. The torch is guided through the kerf that was produced first. The second step cuts pipe 1 as indicated by hatching 12, running from upper right to lower left. The hatching denotes also here the sequential, parallel positions of the flame axis during the second cutting step.

The drawing shows two additional sections 13 and 14. Upon cutting of these particular portions in the second phase, the flame is interrupted particularly by the pipe's hollow interior. However, the pivot angle has been chosen to minimize that danger. During cutting the upper one, 13, of these two horizontally hatched areas is heated and will still be cut through because of its small size, and the kerf will remain clean through despite interruption of the torch flame. For that reason, the equipment is oriented so that area 13 turns out larger than lower area 14. This is particularly so as the two different flame directions for the two cutting phases are not at right angles (in the cutting plane); the flame direction is about 40° to the horizontal during each cutting step. As a consequence, area 14 is now so small so that, in fact, it will melt away upon cutting adjacent portions.

One can see that the apparatus as described has particular advantage in that the thick-walled hollow ingot can be cut in two cutting steps using a single torch suitably pivoted in a particular plane. The hollow ingot does not have to be rotated on its axis. Therefor, the accuracy of the putting plane depends primarily on low clearance tolerances for the journaling of the arm 6 which is readily obtainable. Also, one can see that the two separately produced kerfs do in fact align in a common plane and merge smoothly, they are not off-set relative to each other; they are equally wide so that at the completion a clean cut is produced. Generally, the resulting kerf will be as uniform as pivoting is carried out accurately within a single plane. The resulting loss in material is very low and it was found that finishing operation in the cutting plane of either cut portion is not necessary.

The invention is not limited to the embodiments described above but all changes and modifications thereof not constituting departures from the spirit and scope of the invention are intended to be included.

I claim:

1. Apparatus for cutting a length from a thick-walled hollow pipe, such as tubing produced by continuous casting, using a cutting torch, comprising:

a support means adapted for maintaining particular relative position to the pipe to be cut;

a pivot arm journaled on the support means, the pivot axis extending parallel to the axis of the pipe for enabling said arm to locate in two angularly displaced planar positions about said pipe; and carriage means disposed on the pivot arm for displacement along the arm during cutting for producing a separate kerf in each of said two positions of the arm, the carriage means supporting, moving and orienting the cutting torch relative to the arm and to the pipe during cutting when the arm has particular orientation to the pipe to produce two separate, smoothly merged kerfs aligned in a common plane.

2. Apparatus as in claim 1, including means for maintaining the pivot arm in between two particular positions relative to the pivot axis, the positions being apart by an angle of 90° to 100°.

3. Apparatus as in claim 1, including means for maintaining the torch on the carriage so that the torch flame is directed down and at an angle of about 40° to the horizontal.

* * * * *